US012025250B1

(12) United States Patent
Greenfield

(10) Patent No.: US 12,025,250 B1
(45) Date of Patent: Jul. 2, 2024

(54) RIGID SUPPORT FOR MULTIPLE POLYMERIC TUBES

(71) Applicant: Elliott Greenfield, Rydal, PA (US)

(72) Inventor: Elliott Greenfield, Rydal, PA (US)

( * ) Notice: Subject to any disclaimer, the term of this patent is extended or adjusted under 35 U.S.C. 154(b) by 0 days.

(21) Appl. No.: 17/684,928

(22) Filed: Mar. 2, 2022

(51) Int. Cl.
*F16L 3/13* (2006.01)
*F16L 3/04* (2006.01)
*F16L 3/10* (2006.01)

(52) U.S. Cl.
CPC ...... *F16L 3/13* (2013.01); *F16L 3/04* (2013.01); *F16L 3/1041* (2013.01)

(58) Field of Classification Search
CPC ..... F16L 3/13; F16L 3/22; F16L 3/221; F16L 3/222; F16L 3/04; F16L 3/1041; F16L 3/20; F16L 3/18
USPC .................................................. 248/74.1, 68.1
See application file for complete search history.

(56) References Cited

U.S. PATENT DOCUMENTS

| | | | | |
|---|---|---|---|---|
| 545,620 | A * | 9/1895 | Wood | F16L 3/2235 248/68.1 |
| 551,032 | A * | 12/1895 | Hemphill | F16L 3/2235 24/130 |
| 1,316,255 | A * | 9/1919 | Rauch | F16L 3/2235 248/68.1 |
| 5,002,244 | A * | 3/1991 | Holbury | B60R 16/0215 206/509 |
| 5,054,741 | A | 10/1991 | Ismert | |
| 5,090,645 | A | 2/1992 | Zuercher | |
| 5,743,497 | A * | 4/1998 | Michael | F16L 3/223 248/68.1 |
| 5,765,786 | A | 6/1998 | Gretz | |
| 6,073,891 | A | 6/2000 | Humber | |
| 6,719,247 | B1 | 4/2004 | Botting | |
| 6,857,606 | B1 | 2/2005 | Gretz | |
| 7,207,528 | B2 | 4/2007 | Kato | |
| 9,726,304 | B2 | 8/2017 | Heath | |
| 2005/0011996 | A1 | 1/2005 | Geater | |
| 2007/0114339 | A1* | 5/2007 | Winchester | F16L 3/223 248/68.1 |
| 2007/0235596 | A1 | 10/2007 | Youmans | |
| 2009/0314903 | A1 | 12/2009 | Zahuranee | |

(Continued)

*Primary Examiner* — Christopher Garft

(57) ABSTRACT

A rigid tube support having no flexing sections comprised of an elongated rectangular shape having arcuated round ended slots for restraining multiple PEX (crosslinked polyethylene) tubes used in construction for hydronics and plumbing. These slots have openings to allow the tubes to be freely inserted radially into the openings. These slots further have within each of them a single semicylindrical protrusion axially oriented with the tube trapping the tube from sliding out radially once inserted. The protrusion forces the tube to be temporarily deformed during insertion. When in final position the slots are large enough to allow the tubes to freely rotate and slide axially within the support accommodating linear thermal expansion of the tubes. These larger slots also allow for tube rotation for ease of installation. The curved opening enables the support to be used horizontally as well as vertically. The support keeps the multiple tubes spaced apart and offset from the mounting surface to allow for insulation to be later applied to the tubes. Placed perpendicular and in between each of the tube openings are apertures through which fasteners are inserted. Although there are multiple apertures only two fasteners are required.

1 Claim, 4 Drawing Sheets

(56) References Cited

U.S. PATENT DOCUMENTS

2011/0272535 A1 11/2011 Schmidt
2021/0199204 A1* 7/2021 Althaus ............... B60R 16/0215

* cited by examiner

RIGID SUPPORT FOR MULTIPLE POLYMERIC TUBES

BACKGROUND OF THE INVENTION

1. Field of the Invention

This invention relates to tube supports for fastening tubes to a building member, and in particular to offset tube supports wherein the tube is held in spaced relation to the building member and each other.

2. Description of the Related Art

Tube supports are routinely used for affixing a tube, such as a plumbing pipe, to a building member, such as a wall stud, joist, top plate or base plate. The typical tube support includes a rigid back and a downwardly extending hook or claw which extends outwardly from the top of the back. The back acts as a nail way and includes a nail receiving aperture. A nail extending through the aperture is driven into a building member to secure the support to the building member. The pipe is captured between the claw and the building member. An example is U.S. Pat. No. 5,054,741 Ismert, 1991, see FIG. 1.

A problem with this type of support is that a pipe held in the support will be in contact with the building member. As the pipe expands and contracts with changes in temperature it may rub against the building member causing a noise. Such noise is considered undesirable by homeowners. In addition, heat from hot water pipes can be lost through heat transfer from the pipe to the building member. New PEX (crosslinked polyethylene tubing) now being used in plumbing and hydronic installations are designed to be home run to a distribution manifold. This requires multiple tubes be run to each bathroom appliance. For example, a pair of tubes for hot and cold water to the sink, then a pair for hot and cold for the tub or shower then a cold-water tube to the toilet. A tube hanger holding multiple tubes therefore greatly reduces installation time. A multitube support also allows for a uniform equal spacing between tubes which gives the installation a more professional look that installers prefer.

In his design for a multi wire clamp Michael (U.S. Pat. No. 5,743,497) shows a clamp for multiple Romex wires often referred to as MC cable. Although similar in concept, Michael retains the wire with a resilient tab at the end of its cavity. This then requires the structure to be flexible and not rigid. Wires are solid and so cannot collapse in shape so the support must be soft enough to allow for the wire to enter. Once installed wires get no movement. The new and novel concept presented here distinguishes itself over Michael in that the tube itself and not the support deforms to be captured. This is possible because the PEX tubes are flexible and resilient unlike the wires for which the Michael patent was designed to accommodate. This is completely different capture method. This application relies on a protrusion located midway into the arcuated groove to capture the cylindrical tubing. This application, unlike the Michael patent, is made to be rigid in order to overcome the tube movement caused by pressure changes and flow changes within the tubes.

Another problem is that current tubing supports clamp on the tubes rigidly which reduces the tube's ability to expand and contract with changing fluid temperatures causing noise as previously mentioned.

Another problem is that many state plumbing codes now require that hot water tubing be insulated and as such must be spaced away from mounting surfaces and other tubes to allow for the insulation. Multiple hangers must then be spaced apart to allow for this.

What is needed is an improved tube support which allows for all these factors and which can be mounted vertically or horizontally on building members such as an engineered wood I-joist with a minimum number of fasteners.

What is also needed is a support that can be pre-mounted on building members before the water tube is installed. The installer can then easily draw the tubes through the structure and press them into the supports without the use of any tools. This invention fulfills all these requirements.

SUMMARY OF THE INVENTION

The present invention comprises an offset tube support for fastening multiple tubes to building members. The tube support is substantially rectangular in shape. This invention uniquely uses arcuated grooves to support PEX (crosslinked polyethylene) tubing. Unlike all other PEX tubing support hangers, the invention presented here does not rely on small bending fingers or flexible features of the hanger to support or capture the tube or flexible latches requiring tools to apply. Instead, the rigid structure of the support holds the tube firmly when mounted on the bottom or side of a building member. Once the tube is pushed into the support it is moved angularly on an arc into its final position. What is unique about this design is that it relies on the deformation of the tube itself as the retaining method for holding the tube. This enables the support structure to be more rigid in all radial directions. It is a protrusion placed midway within each groove which deforms the PEX tube at least 10 percent until it moves to its final position. This support depends on the elasticity of the PEX tube not the flexing of the support to hold the tube in place. This support design using arcuated grooves with internal protrusions is thus more rigid. Once in position the tube is then free to move axially as well as rotate about its axis. This freedom of movement eases the installation as the tubing comes in coils and is often threaded through circuitous paths within a building structure during construction. Splices or joints increase costs and are to be avoided. The freedom to rotate and slide is a new and novel capability for PEX supports. The absence of weak bendable fingers in the support makes this design stronger and more reliable. The invention is a multi-tube PEX support without flexing members to hold the tubes.

The tube support additionally has holes perpendicular to the arcuated grooves and spaced between each of them to allow the support to be fastened to building members with screws or nails. Because of the rigid design only two fasteners may be required.

DETAILED DESCRIPTION OF PREFERRED EMBODIMENTS

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. The drawings constitute a part of this specification and include exemplary embodiments of the present invention and illustrate various objects and features thereof.

The support is of unitary construction and is preferably molded of a durable plastic, such as ABS (acrylonitrile butadiene styrene) or HDPE (high density polyethylene) or the like.

The support is used mainly with PEX (crosslink polyethylene tubing) used in water distribution systems. It is a single unit which has grooves 10 for tubes. The grooves are curved as seen in FIG. 2. The curve 11 enables the support to better hold the tubes 12 when used in horizontal mode. Each curved groove of about 90 degrees contains within it a protrusion 13 which inhibits the inserted tube from falling out once inserted. FIG. 8 shows a comparison between the round tube 12 and the deformed tube 13 as it passes by the protrusion 13. To insert a tube into the groove the tube must be compressed with force to pass the protrusion 13. Once passed the protrusion 13 the tube relaxes back to its original shape. The tube is then held loosely in the groove enabling it to move axially and rotate freely. This accommodates thermal expansion of the tubes or pressure surges in the tubes from transferring the forces or noises to the building structure. The embodiments here show holes for fasteners either nails or screws. There are fastener holes 14 between each of the grooves as seen in FIG. 3. For stability only two fasteners are required. Users have the option to use all fastener holes if desired or required. The grooves space the tubes 12 off the building member 15 as shown in FIG. 4 to allow for insulation tubing 16 to be spaced off the mounting member. Fasteners shown as item 17. The grooves are also spaced apart to allow for tube insulation.

Three embodiments of the support are shown. FIG. 5 shows the four groove version. FIG. 6 shows the five groove version. FIG. 7 shows the six groove version. In each version there are fastener holes 14 between each groove.

DESCRIPTION OF REFERENCES

Figure 1:
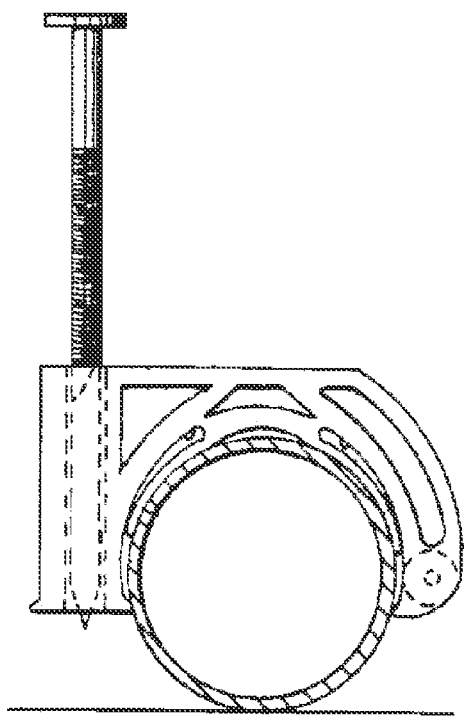
FIG. 1 Shows prior art. U.S. Pat. No. 5,054,741
FIG. 2 Shows view of support as mounted horizontally.
Figure 2:
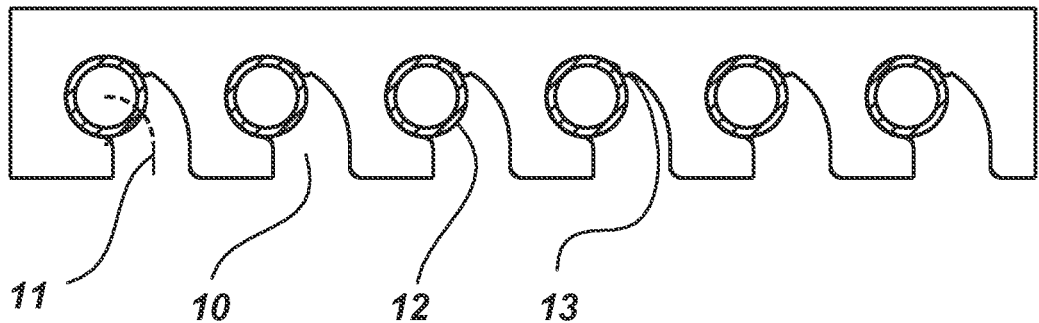
Figure 3:
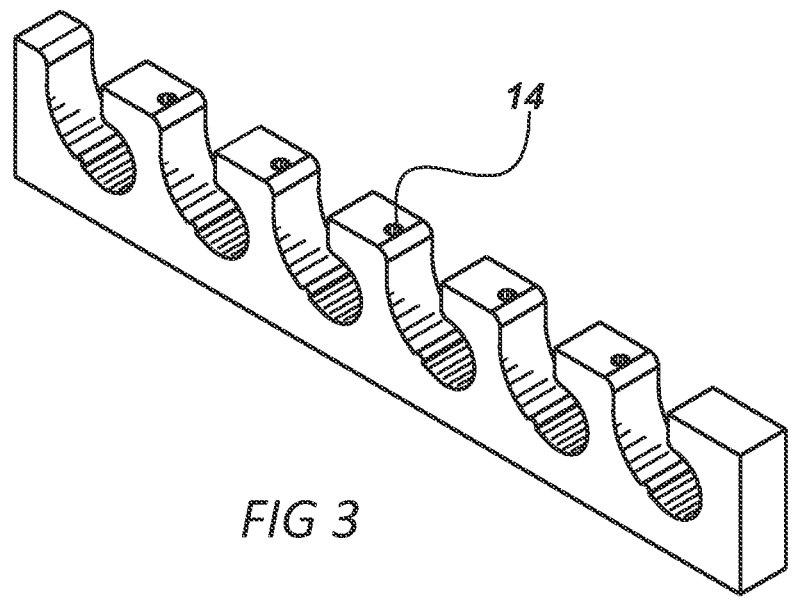
FIG. 3 Isometric view of 6 groove part showing fastener holes.
Figure 4:
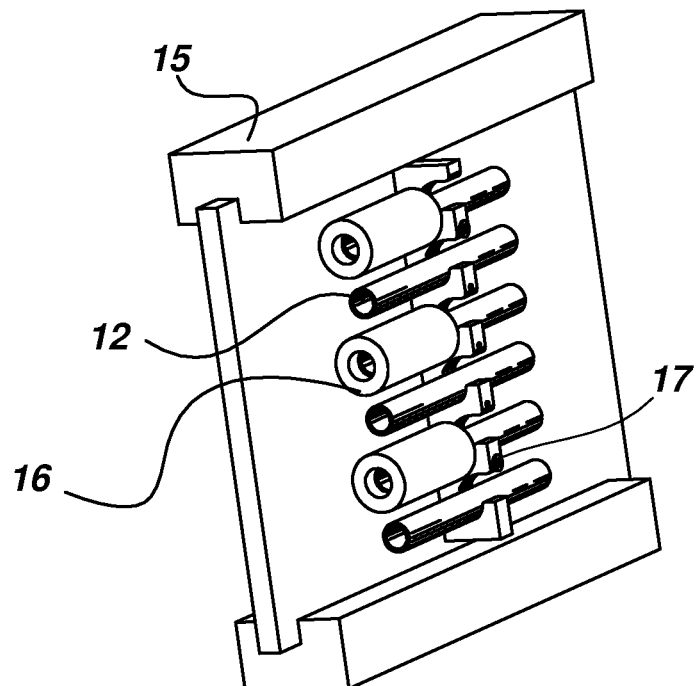
FIG. 4 Part mounted on I-joist with tubes and insulation on alternate tubes.
Figure 5:
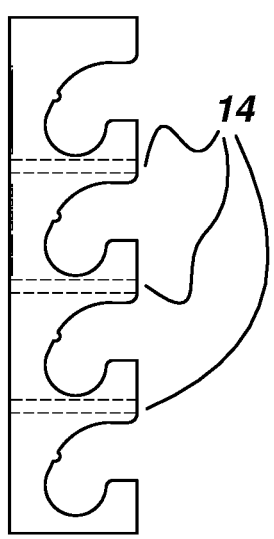
FIG. 5 Four groove version of support pointing out faster holes.
Figure 6:
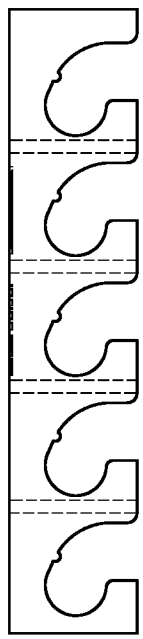
FIG. 6 Five groove version of support.
Figure 7:
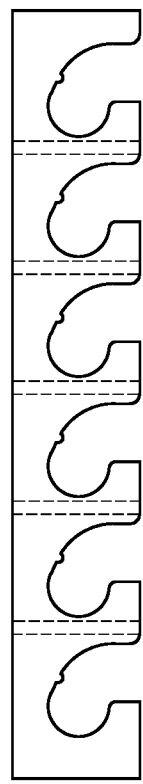
FIG. 7 Six groove version of support.
Figure 8:
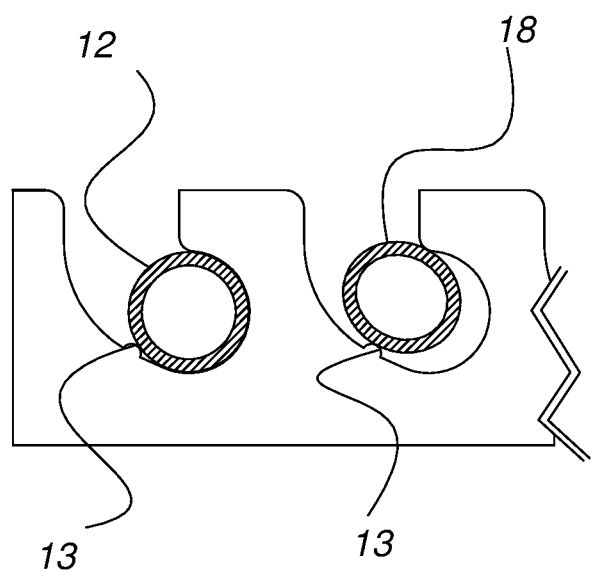
FIG. 8 Side view showing tube deformed by protrusion into an elliptical shape

11. Arc of insertion
12. Tube
13. A semicylindrical protrusion
14. Holes for fasteners
15. I-joist
16. Tube insulation
17. Fastener
18. Elliptical shaped Tube as deformed by protrusion

CONCLUSION, RAMIFICATIONS, AND SCOPE

Typically pipes and tubes used in plumbing and hydronics are hard inelastic conduits. With the advent and adoption of PEX (polyethylene crosslinked) tubing for hydronics and plumbing new concepts are possible. Although not obvious, as PEX tubing has been in use for at least 15 years, this support takes advantage of the elastic characteristic of PEX tubing. The pipe support presented here is a unique design concept and with new functionality unlike all other pipe and tube hangers in use today it is the first to deflect the PEX tube and not the hanger in order to trap the tube into position. This enables the hanger to have a specific design clearance around the tube without the use of clamping screws or flexing hinge parts or bending or deforming sections which may fail over time and are designed to be weak so they may flex. This design also eases installation and thus reduces costs as one single support replaces many. Code often requires supports every 32 inches. Reducing the support installation time makes this invention a cost-effective solution.

What is claimed and desired to be secured by Letters Patent is as follows:

1. A water distribution tube support system comprising:
   a) a plurality of cylindrical crosslinked polyethylene water distribution tubes;
   b) a non-flexible rigid support, said rigid support being an elongated rectangular block and comprising:
      I. a plurality of arcuate round bottom grooves with approximately 90 degrees of arc spaced linearly through a length of said block;
      II. each of said grooves including a singular rigid protrusion spaced midway within said grooves;
      III. a plurality of apertures through said rectangular block between and perpendicular to said grooves to receive fasteners used to affix said support to a building member; and
   wherein said protrusions deform said water distribution tubes during insertion into said grooves but are spaced from said round bottoms so the water distribution tubes are freely rotatable and axially slideable once fully inserted.

* * * * *